H. R. GILSON & J. M. G. FULLMAN.
ATTACHMENT OF ELECTRICAL FIXTURES TO OUTLET BOXES.
APPLICATION FILED AUG. 31, 1914.
1,155,350.  Patented Oct. 5, 1915.
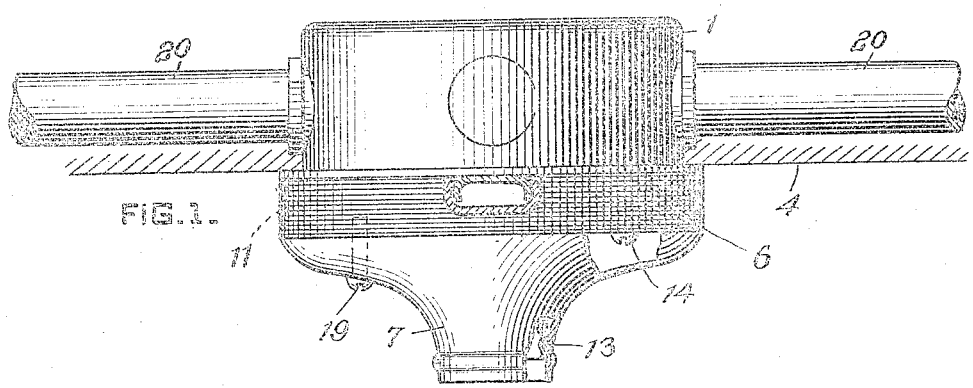
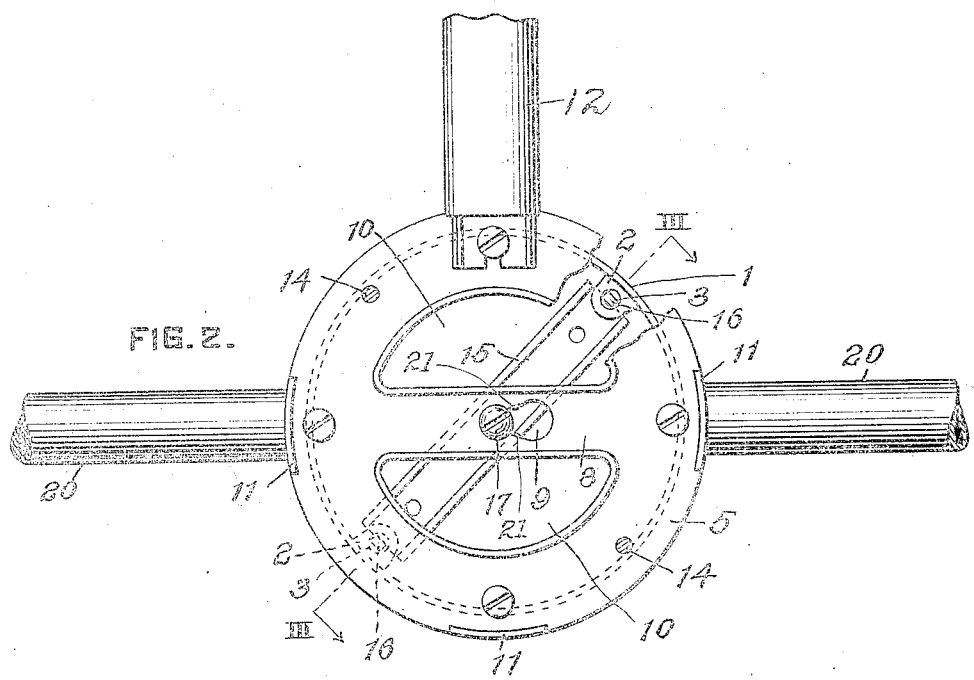

UNITED STATES PATENT OFFICE.

HENRY R. GILSON, OF BADEN, AND JAMES M. G. FULLMAN, OF SEWICKLEY, PENNSYL-
VANIA, ASSIGNORS TO NATIONAL METAL MOLDING COMPANY, OF PITTSBURGH,
PENNSYLVANIA, A CORPORATION OF PENNSYLVANIA.

ATTACHMENT OF ELECTRICAL FIXTURES TO OUTLET-BOXES.

1,155,350.  Specification of Letters Patent.  Patented Oct. 5, 1915.

Application filed August 31, 1914. Serial No. 859,436.

*To all whom it may concern:*

Be it known that we, HENRY R. GILSON, residing at Baden, in the county of Beaver, and JAMES M. G. FULLMAN, residing at Sewickley, in the county of Allegheny and State of Pennsylvania, citizens of the United States, have invented or discovered certain new and useful Improvements in Attachments of Electrical Fixtures to Outlet-Boxes, of which improvements the following is a specification.

It is the object of the invention described herein to provide an efficient and structurally rigid means for connecting electrical fixtures to wall outlet boxes, and particularly such electrical fixtures as are adapted to be connected to metal molding electrical conductor conduits for extending branch circuits along the surface of a wall, ceiling or other suitable support.

In the accompanying sheet of drawings, forming part of the specification, the preferred embodiment of the invention is illustrated.

Figure 1 is an elevation of an outlet box with a lamp socket structure secured thereto, the outlet box being placed within a wall and connected to inner wall conduits; Fig. 2 a bottom plan view of the socket base plate, showing its connection to the outlet box; and Fig. 3 a sectional view taken on the line III—III, Fig. 2.

In the several figures like numerals are used to designate like parts.

The outlet box 1 may be of any desired construction, that shown herein being cylindrical, and provided adjacent to its open face with inwardly-extending supports in the form of oppositely disposed lugs 2 having holes 3. As is usual, the outlet box is placed within the surface of a wall or ceiling indicated at 4, and has inner wall electrical conductor conduits 20 attached to it.

In attaching electrical fixtures to such outlet boxes, it is, for various reasons, often desirable to place the fixture in a different angular position than it would occupy if it were secured directly to the lugs 2. This is particularly the case when the electrical fixture is adapted to be used as a circuit extension box, that is, a box provided with means for having metal molding or other surface conduits attached to it. In electrical fixtures of this type it will be understood that it may be desirable to have the metal molding extend in various angular directions with relation to the center of the outlet box and electrical fixture, and different than a fixed position of the fixture would permit. Our invention therefore contemplates a firm and efficient connection of electrical fixtures to outlet boxes, such connection permitting of an adjustment of the fixture to any desired angular position.

Various types of electrical fixtures may, in the practice of our invention, be attached to outlet boxes. The fixture shown herein is a lamp socket, and in its preferred form consists of a base plate 5, a porcelain block 6, and a metal cap 7. The base plate has a central transversely extending rib 8 provided with a key-hole slot 9, and at each side of the rib there is a passageway 10 through which electrical conductors leading from the outlet box may pass. Also, the base plate is provided with peripheral upturned lugs 11 which form closures for conduit receiving openings in the porcelain block, as seen best in Fig. 1. In the present illustrative embodiment of my invention one of such lugs has been removed and a metal molding conduit 12 secured to the plate 5, as seen in Fig. 2. The porcelain block 6 is provided, in a well known manner, with a socket 13, and is secured to the plate 5 by screws 14, the cap 7 being partially broken away in Fig. 1 to show such socket and one of such screws.

In effecting a rigid yet adjustable attachment of the fixture to the outlet box, we provide a spanner 15, which, for structural purposes, is preferably channel-shaped in cross-section, and which preferably has a tongue 16 at each end thereof adapted to engage a hole 3 of the lugs 2. The plate 5 is secured to the spanner by means of a clamping member preferably in the form of a screw 17, which engages a centrally-disposed screw-threaded hole 18 in the spanner. By using such a connection, it will be seen that, before tightening the screw 17, the plate 5 may be adjusted to any desired position, thus placing its conduit-attaching holes to point in any desired direction. In order to keep the screw 17 centrally of the plate 5 and at the end of the slot 9, the edge of the slot is provided with upturned lugs 21, against which the head of said screw abuts in case there is a tendency of the screw to move toward the enlarged portion of the slot.

To install the electrical fixture, the spanner, with the screw 17 partly inserted in the hole 18, may be placed with its tongues 16 extending into the holes 3 of the lugs 2. The plate 5 may then be placed in its intended position, the enlarged portion of the key-hole slot 9 being first passed over the head of the screw 17, and the screw then tightened. The block 6 may then be attached to the plate 5 by screws 14, and the metal cap 7 to such block by screws 19.

We claim as our invention:

1. In an electrical installation, the combination of an outlet box provided adjacent to its open face with inwardly extending lugs having holes therein, a spanner having tongues at its opposite ends engaging the holes of said lugs, and means for adjustably attaching an electrical fixture to said spanner.

2. In an electrical installation, the combination of an outlet box, inwardly extending supports adjacent to the open face of said box, a spanner engaging said supports at its opposite ends, an electrical fixture, and a single clamping member engaging said fixture and said spanner at its central point.

3. In an electrical installation, the combination of an outlet box, inwardly extending supports adjacent to the open face of said box, a spanner engaging said supports at its opposite ends, an electrical fixture comprising in part a base plate having a transversely extending rib with a passageway at the side thereof, and means for attaching said plate through the rib thereof to said spanner.

4. In an electrical installation, the combination of an outlet box provided adjacent to its open face with oppositely disposed inwardly-extending lugs having holes therein, a spanner having tongues at its opposite ends engaging the holes of said lugs and having a central screw threaded hole, an electrical fixture comprising in part a base plate having a transversely extending rib with a centrally disposed key-hole slot, and a screw extending through said slot and engaging the screw threaded hole of said spanner.

In testimony whereof we have hereunto set our hands.

HENRY R. GILSON.
JAMES M. G. FULLMAN.

Witnesses:
PAUL N. CRITCHLOW,
FRANCIS J. TOMASSON.